May 1, 1928.

L. L. EDMUNDS 1,667,930

BAG FILLING APPARATUS

Filed Aug. 22, 1927  6 Sheets-Sheet 1

INVENTOR.
Louis L. Edmunds.
BY Townsend, Loftus & Abbott
ATTORNEYS.

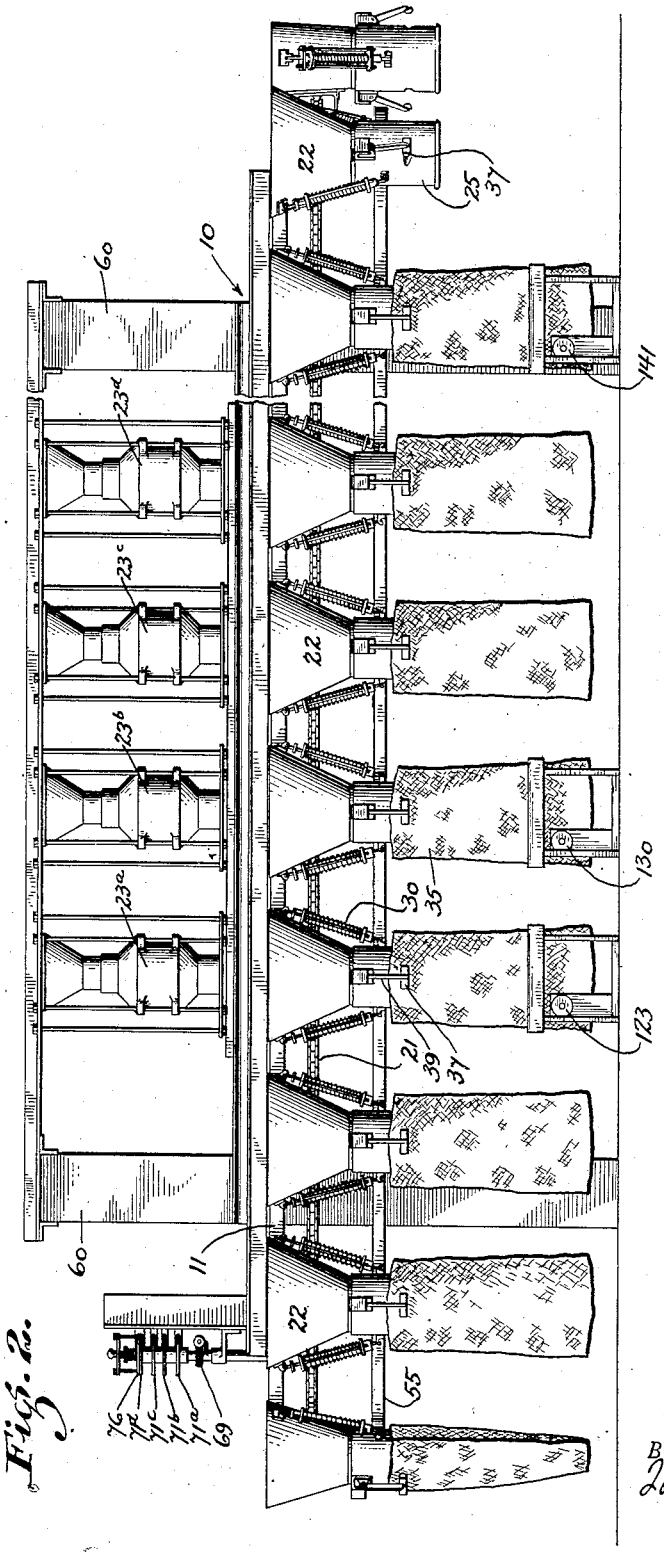

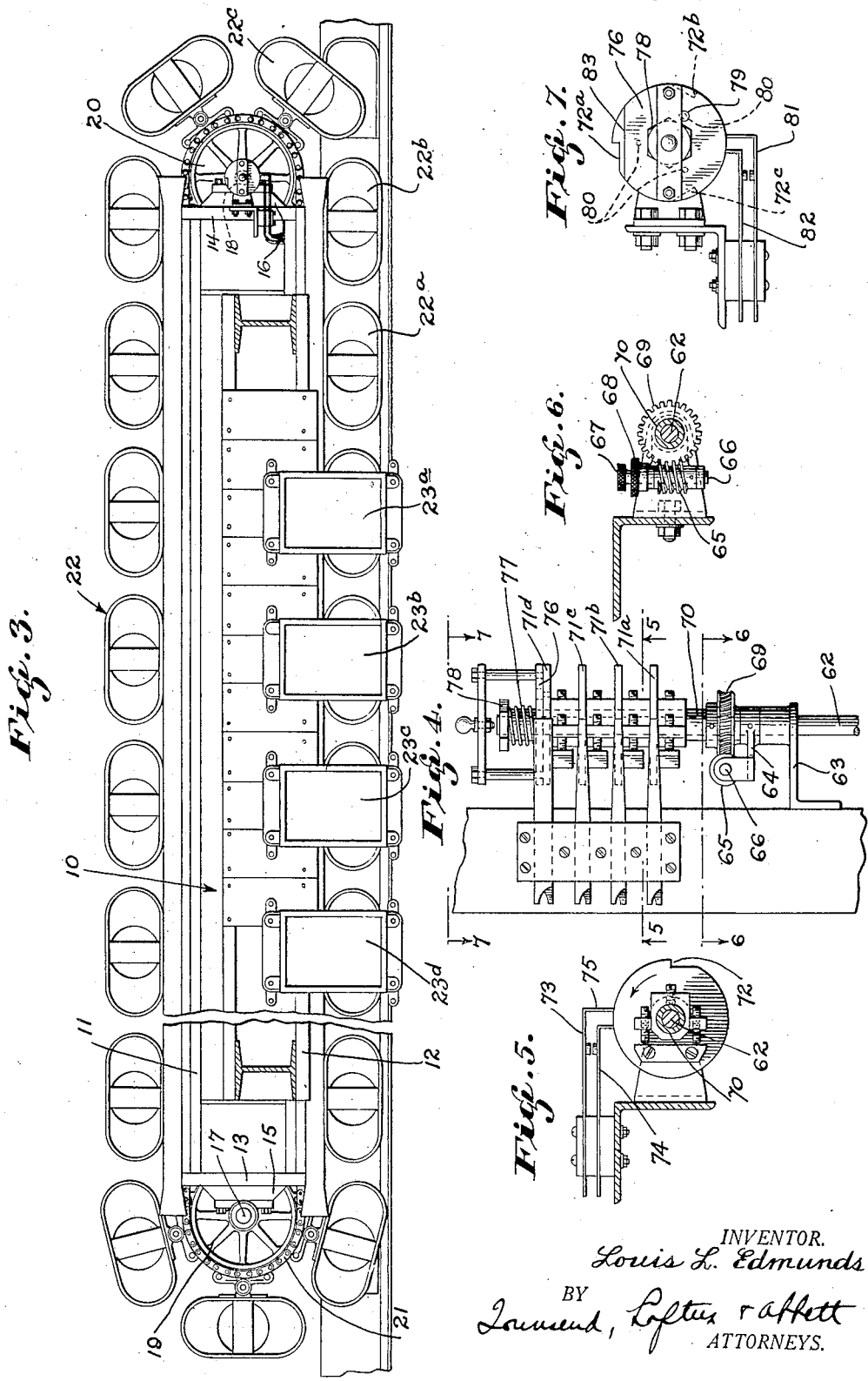

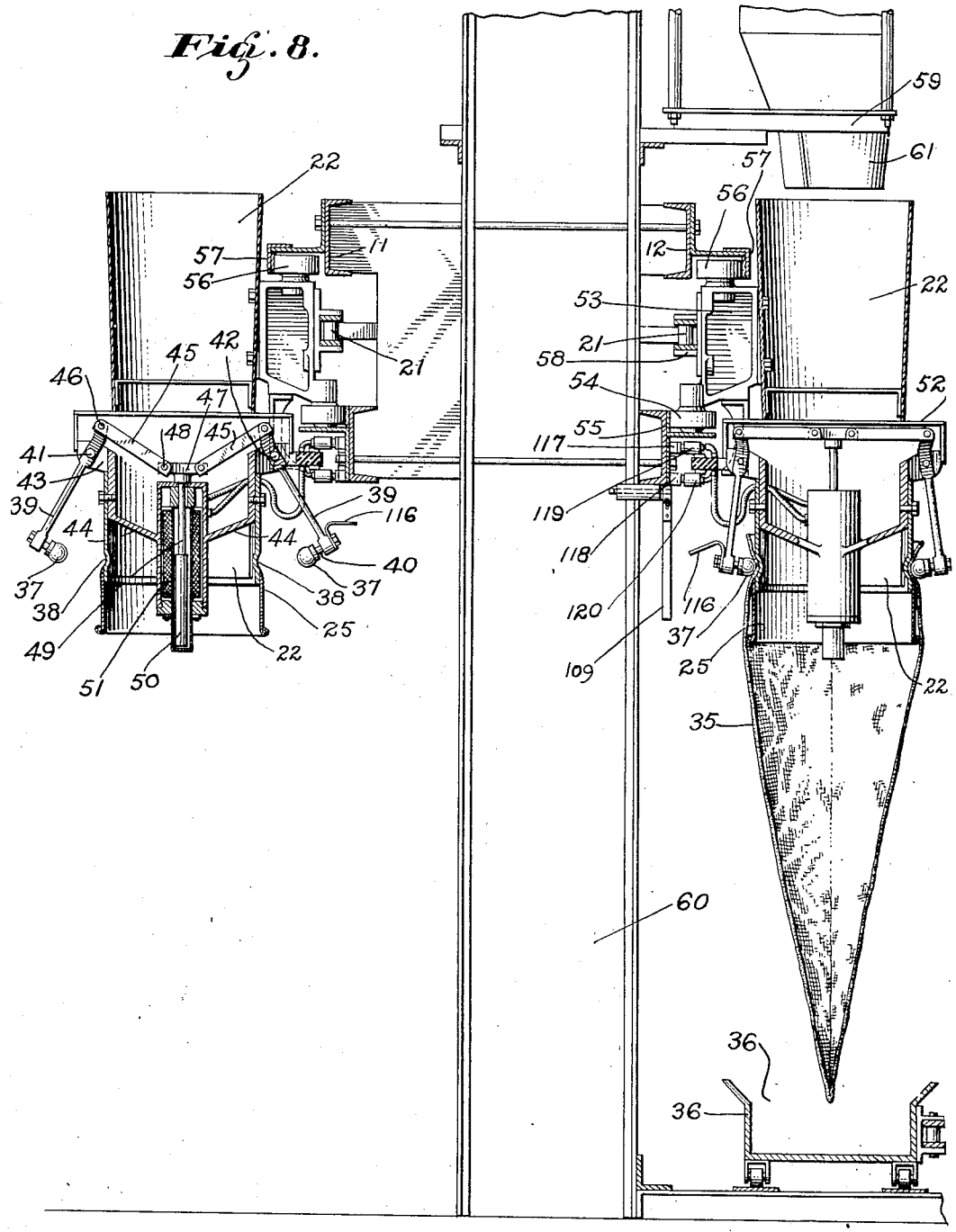

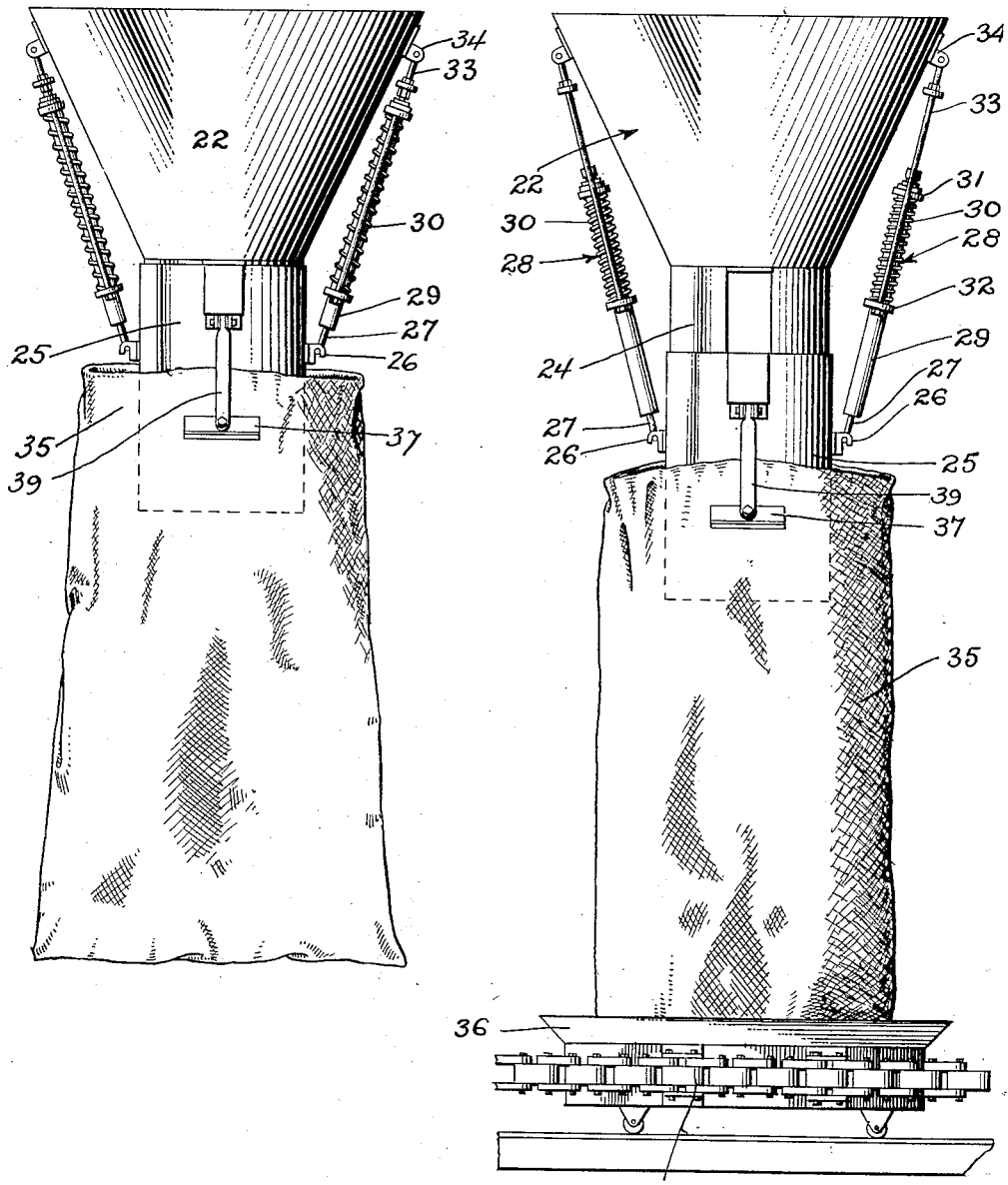

May 1, 1928.
L. L. EDMUNDS
1,667,930
BAG FILLING APPARATUS
Filed Aug. 22, 1927
6 Sheets-Sheet 6
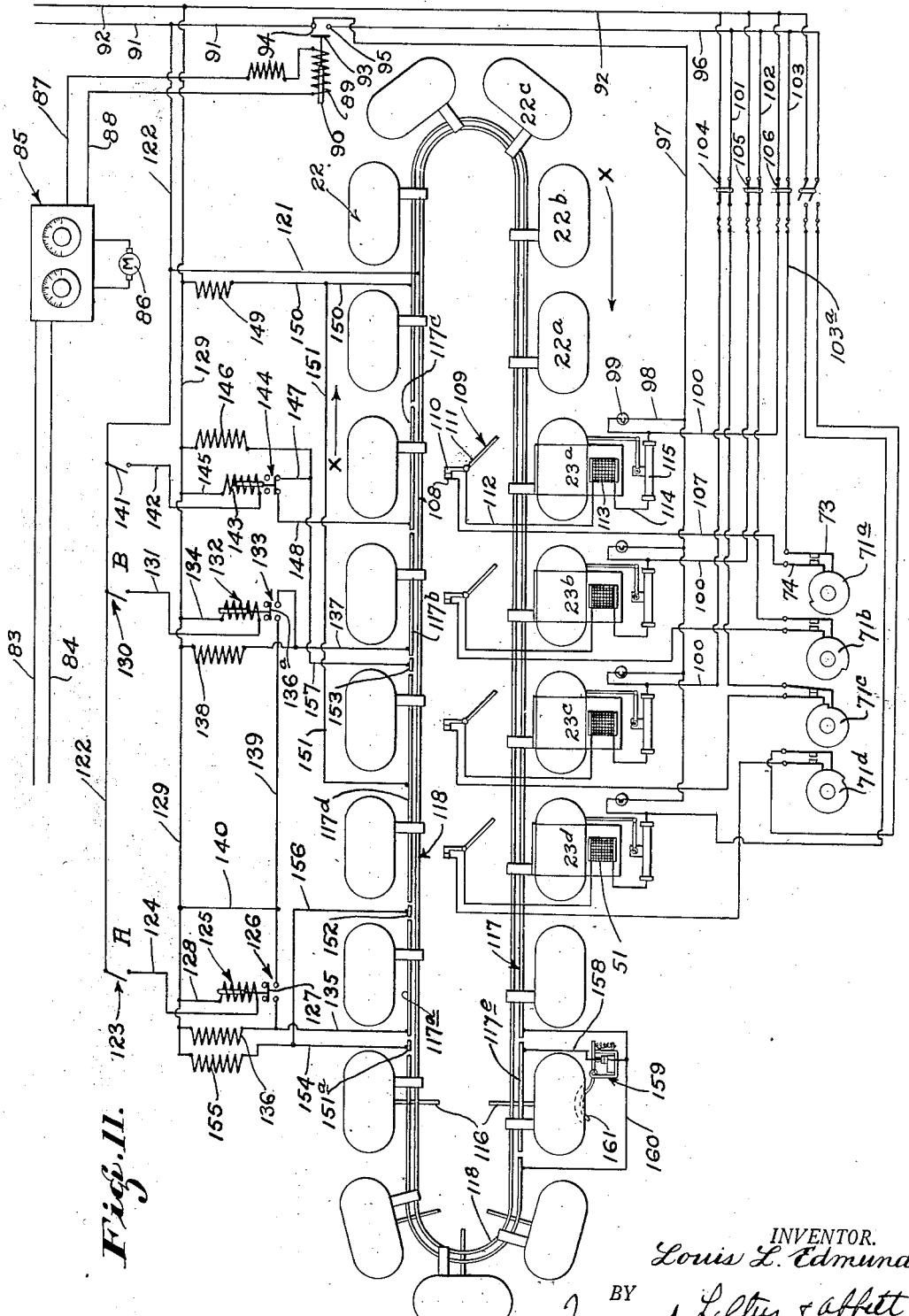
INVENTOR.
Louis L. Edmunds
BY
Townsend Loftus & Abbett
ATTORNEYS.

Patented May 1, 1928.

1,667,930

UNITED STATES PATENT OFFICE.

LOUIS L. EDMUNDS, OF CROCKETT, CALIFORNIA.

BAG-FILLING APPARATUS.

Application filed August 22, 1927. Serial No. 214,549.

This invention relates to a weighing and conveying apparatus, and particularly pertains to a bag filling machine.

In the manufacture and distribution of powdered and granulated commodities which are dispensed in bags it is desirable to provide means which will rapidly weigh predetermined amounts of material and deposit these weighed amounts of material in bags, by a purely mechanical operation, and whereby the material may be weighed and "racked" in a minimum period of time, and by a machine which eliminates a large amount of manual attendance.

The present invention contemplates the use of a machine especially adapted for weighing and conveying sugar, and which machine embodies an endless conveyor having a plurality of hopper members upon which bags may be placed and will be automatically held in their placed position throughout a desired period of travel, and during which time they will be automatically passed beneath weighing scales from which a measured quantity of sugar will be delivered into each of the bags as the said bags continue their travel, and after which filling operation the bags are automatically released from the conveyor and are then ejected onto other mechanism with which the present invention is not concerned.

The invention is illustrated by way of example in the accompanying drawings, in which—

Fig. 2 is a view in side elevation similar to Fig. 1, showing the opposite side of the machine from its filling side, and more particularly disclosing the station at which the empty bags are placed upon the spouts.

Fig. 3 is a view in plan with parts broken away, showing the endless conveyor arrangement and the spouts associated therewith.

Fig. 4 is an enlarged fragmentary view showing the scale timing cams.

Fig. 5 is a view in transverse section showing one of the scale timing cams as seen on the line 5—5 of Fig. 4.

Fig. 6 is a view in transverse section through the adjusting mechanism for the scale timing cams as seen on the line 6—6 of Fig. 4 and in the direction of the arrows.

Fig. 7 is a view in transverse section through the scale timing mechanism, as seen on the line 7—7 of Fig. 4, and disclosing the master timing cam.

Fig. 8 is an enlarged view in central, vertical section through the machine, as seen on the line 8—8 of Fig. 1, and particularly disclosing the bag holding means in operative and inoperative positions.

Fig. 9 is a view in side elevation showing one of the supporting hoppers with an empty bag attached, and which hopper is moving under a filling spout.

Fig. 10 is a similar view, showing the hopper as it is passing from the filling station, and disclosing the manner in which the moving hopper is extended due to the additional weight supported thereby when the bag is filled.

Fig. 11 is a view showing the wiring diagram embodied in the present invention.

Figure 1:
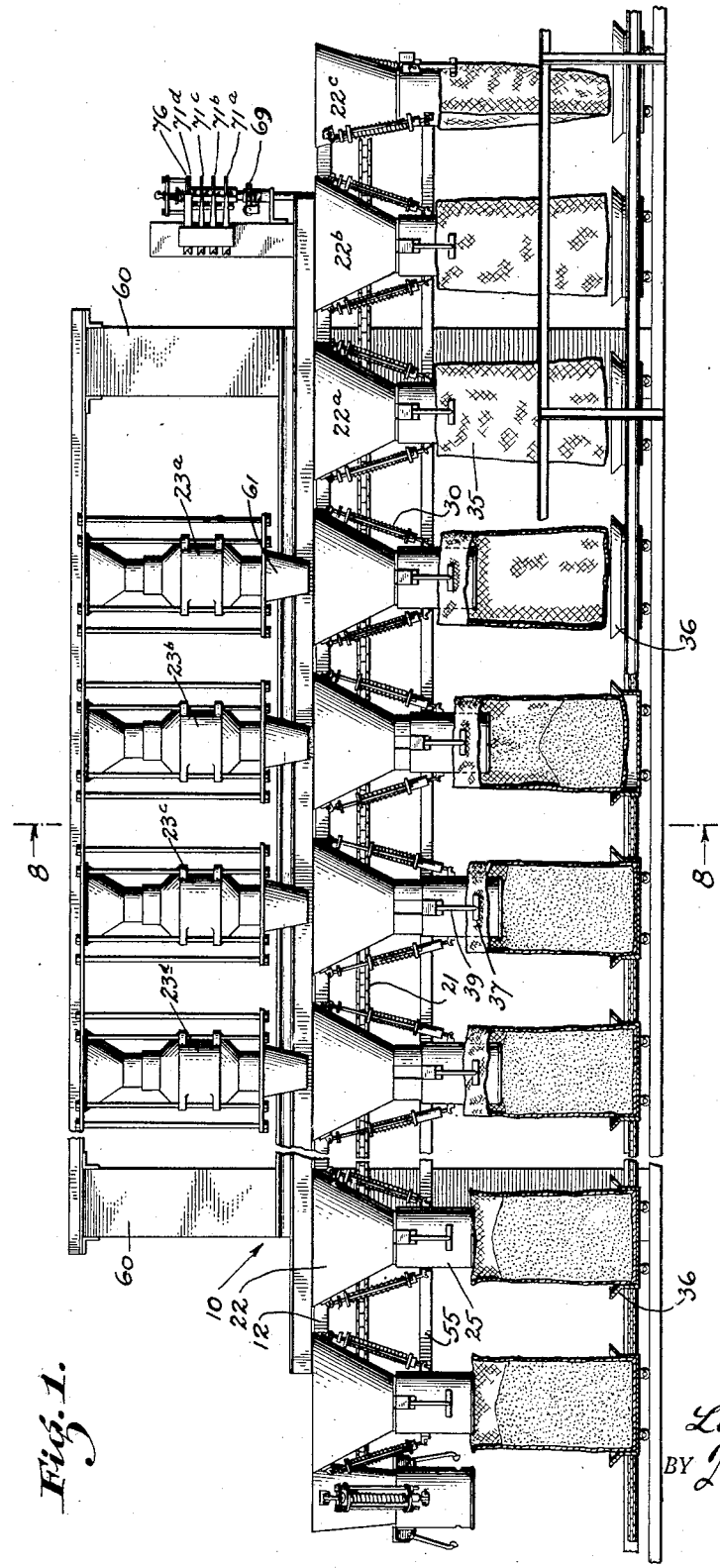
Fig. 1 is a view in side elevation showing the present invention as viewed from the filling side of the machine.

Referring more particularly to the drawings, 10 indicates a main frame structure comprising longitudinally extending frame members 11 and 12, to the opposite ends of which transverse frame numbers 13 and 14 are secured. These various members form a rectangular frame, around which the bag filling machine is assembled. Secured to the end frame members 13 and 14 are journal boxes 15 and 16. The journal box 15 carries a vertical shaft 17, and the journal box 16 carries a vertical shaft 18 which is parallel to the shaft 17. These shafts carry sprockets 19 and 20 respectively, around which a conveyor chain 21 is rove. This chain travels in a horizontal plane, and carries a plurality of travelling spout members 22. The number of hoppers carried by the chain is determined by the number of scale units 23 with which the machine is provided, as will be hereinafter explained. The hoppers have oval, flaring mouths, the side walls of the hoppers converging and forming a cylindrical spout 24. This spout section extends downwardly and receives a spout sleeve 25, which telescopes over the spout portion 24 and forms a continuation thereof. The sleeve 25 is provided upon its opposite sides with lugs 26 receiving the stirrups 27 of hanging mechanism 28. These stirrups are attached to cylindrical members 29, around which coil springs 30 are wound. The members 29 extend upwardly through the springs, and are fitted at their upper ends with cross-heads 31 against which the upper end of the springs seat. The lower end of each spring is fitted with a cross-head 32, through which the cylindrical members 29 project, and which cross-head forms a seat for the lower ends of the springs 30. Extending upwardly along opposite sides of the springs through openings in the cross-head 31 is a pair of hanger rods 33 which engage the cross-head 32 at their lower ends, and are secured to lugs 34 at their upper ends. The lugs 34 are attached to the side walls of the hoppers 22. It will therefore be evident that the sleeve 25 may be pulled or forced downwardly with relation to the spout 24 as the springs 30 are compressed. This mechanism has been provided to permit the sleeve to move downwardly with a bag 35 which is temporarily secured thereto, and during which time the bag is being filled with sugar, said downward movement taking place until the weight of the bag has been disposed upon an endless travelling conveyor 36 moving along a path of travel parallel to the path of travel of the hopper conveyor 21 during that portion of the travel of the bags along the filling side of the machine.

Means are provided for holding the bags 35 on the sleeves 25 of the travelling hoppers 22, and which means will automatically release the bags at the end of the filling operation or will retain them on the sleeves in the event that the scales do not operate. This mechanism is more clearly shown in Fig. 8 of the drawings, where it will be seen to comprise a pair of clamping bars 37 disposed on diametrically opposite sides of the sleeve 25, and having rounded surfaces adapted to register with recesses 38 in the sides of the sleeve, and between which surfaces 38 and the bars 37 the bag 35 may be clamped. The clamping bars 37 are adjustably secured on the lower ends of swinging arms 39 by adjusting screws 40. These arms swing outwardly in diametrically opposite directions upon the opposite sides of the sleeve 25, and are mounted upon pivot pins 41 and 42 carried by the lugs 43 which form a part of a solenoid supporting spider 44. The upper ends of the levers 39 are fitted with links 45, which are pivoted to the levers by pins 46 and are secured to the opposite sides of a cross-head 47 by pins 48. The cross-head 47 is fastened by a rod 49 to the plunger 50 of a solenoid coil 51, and by which coil the plunger 50 may be moved in an upward direction to act upon the levers 45 and to swing the clamping levers 39 inwardly to their clamping position by a toggle action. It is to be understood that the spiders 44 do not completely close the passageway through the sleeve 25, but permit sufficient room to allow sugar to freely pass from the hopper 22 through the sleeve 25 and into the sack 35. The spider 44 is rigidly secured with bolts to the sleeve 25. This bracket is fitted at its lower end with a roller 54 which bears against the vertical plane of a track 55. The upper end of the bracket 53 is fitted with a roller 56 which bears outwardly against a guide rail 57. At a point intermediate the rollers 54 and 56 the bracket 53 carries lugs 58 which connect with the sprocket chain 21. By this arrangement it will be seen that the sprocket chain 21 causes the hoppers 22 to move horizontally, and that the rollers 54 and 56 support the weight of the travelling hoppers 22 and the load imposed thereupon.

Carried upon a platform 59 disposed above the path of travel of the hoppers 22 and further supported by uprights 60, is a series of scales comprising different units indicated by the numerals $23^a$, $23^b$, $23^c$ and $23^d$. An exact construction of these scales will not be described in the present case, other than to state that they are of commercial design adapted to automatically weigh a predetermined quantity of material, and to be further provided with means whereby this quantity of material may be released at a desired time in relation to the movement of a receptacle into which the material is to be discharged. Figs. 4 to 7 inclusive, and 11, show the apparatus by which the measured quantities of sugar are discharged, and will be discussed in detail hereinafter. The various weighing units are fitted with filling spouts 61 which have a relatively small discharge opening as compared to the elongated mouth of the hopper 22. This relation is shown in Figs. 9 and 10 of the drawings, where it will be seen that during the time the hopper 22 continues to travel beneath the spout, the spout will have sufficient time to discharge the previously measured quantity of sugar into the bag 35 carried upon the sleeve 25.

In the drawings of the present case four scales are shown, numbered $23^a$, $23^b$, $23^c$ and $23^d$. The first three of these scales are the service scales of the machine, while the scale unit $23^d$ is an emergency unit which may be selectively supplemented in its operation for any one of the service scales at a time when they are out of order, or otherwise rendered inoperative. The number of travelling hoppers 22 is determined by the number of service scales with which the machine is supplied. It will be understood that any desired number of service scales may be used, and that the number of travelling hoppers will be a multiple of the number of service scales. In the present case this will mean that for the operation of the machine here disclosed the travelling hoppers will be considered as operating in groups of three, as for example hoppers Nos. $22^a$, $22^b$, and $22^c$. In the present arrangement, therefore, the hopper $22^a$ will receive the contents of scale unit 23ᵃ as it passes there beneath. The hopper 22ᵇ will advance and will pass beneath the scale unit 23ᵃ and will receive material from the unit 23ᵇ as it passes there beneath. The hopper 22ᶜ will advance and pass beneath the scale units 23ᵃ and 23ᵇ, and will receive the contents of the scale 23ᶜ as it passes there beneath. In the event that either of the service scales is inoperative the hopper intended to receive material from said scale will pass beneath the three service scales and will receive material from the emergency scale, so that the operation of the machine will not be interrupted. The mechanism for causing the scales to operate in synchronism with the travelling hoppers 22 is disclosed in detail in Figs. 4 to 7 inclusive, where a cam shaft 62 is shown as carried by a suitable bearing 63. This shaft is provided with a radial arm 64 which carries a worm 65 so that the arm 64 and the worm will move around the axis of the shaft 62 as this shaft rotates. The worm 65 is mounted upon an adjustable spindle 66 which may be rotated by a knurled head 67, and may afterwards be locked by a lock nut 68. The worm is in constant mesh with a worm wheel 69, and when the worm is rotated by the adjusting head 67 it is evident that the worm wheel will be rotatably set with relation to the gear. The worm wheel is mounted upon a cam sleeve 70, which sleeve carries a plurality of cams, here indicated as 71ᵃ, 71ᵇ, 71ᶜ and a master cam 71ᵈ. It is to be understood that cam 71ᵃ controls the scale unit 23ᵃ, while cam 71ᵇ controls scale unit 23ᵇ, and cam 71ᶜ controls scale unit 23ᶜ. These scale units are the service scales of the machine. The master cam 71ᵈ controls the emergency scale unit 23ᵈ, and may be selectively set to function in place of any one of the cams for the service scales. The three service scale cams 71ᵃ to 71ᶜ inclusive are each circular, and have a segmental notch 72 formed in their otherwise circular face. This face as shown in Fig. 5 of the drawings, normally supports a spring contact finger 73 and holds it out of contact with a spring contact finger 74. The finger 73 has a downturned end portion 75 which bears against the circumferential edge of the cam and holds the two fingers in separated relation one with the other until such time as the downturned portion 75 encounters the notch 72. The finger 73 will then flex towards the finger 74 and close an electric circuit, which will be hereinafter described. Each of the service cams is supplied with a pair of these fingers controlling individual circuits of the service scales release mechanism. The master cam is shown in Fig. 7 of the drawing, where it will be seen to have three notches, here designated as 72ᵃ, 72ᵇ, and 72ᶜ. A disk 76 of equal diameter with the service cam 71ᵃ is normally held against the side of the cam by a compression spring 77 which is interposed between the disk 76 and a nut 78, carried on the end of the sleeve 70. A pin 79 extends from the face of the disk, and may be brought to register with one of three openings 80, so that when the disk is rotated and set with its pin 79 in a desired opening 80 in the master cam 71ᵈ, the disk 76 will uncover one of the notches 72 in the edge of the cam, and will permit this notch to act effectively in closing a circuit through contact fingers 81 and 82, and thus completing a circuit through the release mechanism of the emergency scale 23ᵈ. By reference to Fig. 7 of the drawing it will be seen that the disk 76 has a cut-away segment 83 which will render one of the notches of the master cam 71ᵈ effective, and will make the other notches ineffective at the same time.

*Wiring arrangement.*

By reference to Fig. 11 of the drawing it will be seen that various switches are provided to be actuated at different stations along the path of travel of the travelling hoppers 22. These switches will be described in detail as the operation of the machine is explained, reference being had to the wiring diagram. The main feed wires 83 and 84 are indicated in Fig. 11 of the drawing as connecting with a differential time delay relay 85. This device initially establishes a power circuit through a driving motor 86 of the machine, and by which the travelling conveyor 21 and the travelling hoppers 22 are propelled. The relay is designed to close a secondary circuit after the operating motor of the machine has been in operation for a predetermined period of time, so that the various units of the machine will begin to function after the machine has attained its normal speed. When this speed has been reached, the differential timing relay 85 will then establish a circuit along conductors 87 and 88 through a coil 89. This coil, when energized, will move a solenoid plunger 90 and cause it to close a circuit from a D. C. feed wire 91 to a return wire 92 through certain electrical apparatus which will be hereinafter described. The plunger 90 is fitted with a contact plate 93 making contact between members 94 and 95. The member 94 is connected with a lead wire 91, while the member 95 is connected with a distributor wire 96. The wire 91 is also continuously connected with a wire 97 which leads to a wire 98 secured to one side of a pilot light 99, which indicates when the scale units are in operation. The opposite side of each of these lights is connected with a wire 100, through which the pilot light circuit is completed. The wire 96 is provided with three wires, 101, 102 and 103. These wires lead to switches 104, 105 and 106. On the opposite side of these switches the circuit from wire 96 continues along wire 103 to a wire 103ª, which is secured to spring contact finger 73 of timing cam 71ª. When this cam is in its relieved position the circuit will be completed through the contact finger 73 to finger 74, and then along the wire 107 to a contact point 108 of a scale unit switch 109, which is associated with the scale unit 23ª. A movable contact point 110 forms a part of the switch, and is carried by a lever 111, which may swing to separate the contacts 108 and 110 and break the circuit. The lever 111 is provided with a wire 112 leading to one side of an operating magnet 113 of the scale unit 23ª. The other side of this magnet is provided with a conductor 114 attached to a mercury balance switch 115 which, when in proper position as determined by the level of the material in the scale, will cause the circuit to continue through the switch from conductor 114 to conductor 100 and then to the return feed wire 92. The circuits of the other scale operating mechanism will not be separately described; but the wires will be given the same reference numerals. It will be observed, however, that when the unit switch 109 is actuated, the circuit through the scale release magnet 113 will be broken. This will occur at such a time as a bag is not upon the sleeve of the travelling hopper 22 upon which it is usually applied. This condition causes the lever arms 39 of the bag clamping mechanism, as shown in Fig. 8, to stand in their outermost positions with a trip finger 116 held so that it will encounter the lever 111 at a point in its path of travel, and will at that time break the circuit so that the sugar will not dump into the hopper and then pour onto the floor due to the fact that the sleeve of the particular hopper is not supplied with a bag. The mercury switch is so arranged as to insure that the circuit through the magnet 113 will not be completed except when the switch is in a predetermined position of balance as controlled by the level of the sugar within the scales.

When the machine is operating, the bags will be applied to the sleeves 25 (Figs. 1, 2, 8, 9 and 10) at stations A and B, at which time the solenoids 51 of travelling hoppers 22 may be individually energized by the operator as he places the bag around the sleeve 25 and in position to be gripped between the members 37 and 38. In Fig. 11 it will be seen that continuous rails 117 and 118 are provided. These rails are also shown in Fig. 8 of the drawings, where it will be seen that sliding contactors 119 and 120 are carried by the separate hopper units 22 and make it possible to establish a circuit from the rails through the solenoid coils 51. One of the rails, as here indicated at 118, is continuous throughout its length, and is connected with a wire 121 secured to a wire 122 and the feed wire 91. The other rail is broken at different points throughout its length of travel in order to make it possible to impress a current of increased voltage upon the solenoid 51, or to permit the voltage to be dropped in order to release bags which have been engaged by the clamping mechanism.

At the bag hanging station A is a switch 123. This switch may be in the form of a foot pedal switch, or any other form convenient for the use of the operator. One side of this switch is connected to the wire 122, and the other side is connected to a wire 124 which leads to the solenoid 125 of relay switch 126. This solenoid actuates a switch blade 127. A return current through the coil of the solenoid is completed along a wire 128 to a wire 129 connecting with the D. C. feed wire 92. At the station B a switch 130 is provided, connecting on one side to a wire 122 and on the other side to a wire 131. This wire is secured to a solenoid 132 of a relay switch 133. A circuit is completed through the coil of the solenoid to the return wire 129 along a wire 134. These two switches 123 and 130 have been provided so that the bag clamping solenoid 51 may be actuated by the operators at the stations A and B after a bag has been properly placed on the sleeve 25 of the travelling hoppers 22. Under normal conditions a circuit is partially completed through the main feed rail 118 and the various segments of rail 117 from D. C. feed wire 91 along wire 122 to the wire 121, and thence to the continuous feed rail 118. Segment 117ª is provided with a wire 135 which is secured to one side of a 125 ohms resistance coil, as indicated at 136. The circuit then continues along wire 129 to the feed wire 92. A similar arrangement causes the circuit to be completed from the rail 118 across to the rail segment 117ᵇ along the wire 137 leading to one side of a 125 ohms resistance coil 138 to the return wire 129. It is to be understood that the amount of current which may flow through the circuits, including the 125 ohms resistance coils, is not sufficient to operate the bag clamping solenoids, and it is therefore necessary to increase the voltage through the sections 117ª and 117ᵇ in order to produce a clamping action between the members 37 and 38. This is accomplished by closing either of the switches 123 or 130 at the bag hanging stations A and B respectively. When these switches are closed the relay switches 126 or 133 operating coil of switch is energized to close circuits from the selected rail sections 117ª or 117ᵇ through wires 135 or 137 to the contactors 127 or 136ª, and thence along a wire 139 to a wire 140 which is secured to the wire 129. In this manner the full voltage of the lead wires 91 and 92 may be delivered to the rail 118 and the section 117ª or the section 117ᵇ, as the case may be. It is to be understood that the hoppers 22 are travelling in the direction of the arrow X, as indicated in Fig. 11, and that they will successively pass the bag hanging stations A and B. It may be found desirable to drop a bag from one of the sleeves of the hopper after it has been clamped thereon due to an improper application to the sleeve, and this is accomplished by a bag drop switch 141 secured on one side to the wire 122 and upon the opposite side to a wire 142. This switch leads to solenoid 143 of a relay switch 144. The circuit is completed through the coil of the solenoid along a wire 145 to the wire 129. Under normal conditions the switch 144 completes the circuit from wire 129 through a resistance coil 146 to a wire 147, which is fastened on to one contact of the switch 144. The opposite contact of the switch is attached to a wire 148 which is secured to a release rail section 117ᶜ, which is a composite part of the feed rail 117. It will be evident that when solenoid 143 is energized the circuit from the wire 129 through resistance 146, wires 147 and 148 to section 117ᶜ will be disconnected and will cause the weight of the plunger 50 of one of the bag clamping operating solenoids to fall and simultaneously swing the arms 39 outwardly to release the bags.

Interposed between the sections 117ª and 117ᵇ of the outer trolley rail is a section 117ᵈ. This section is of greater length than the sections between which it is disposed, and may have a plurality of hoppers in contact therewith at the same time. For that reason current of increased strength is delivered to this section as well as the main length of the outer rail 117. The current is supplied from wire 129 through a 5-ohms resistance coil 149 to a wire 150 and thence along a wire 151 to the section 117ᵈ. The circuit may then be completed across the space between the rails by the contact members 119 and 120 of Fig. 8, and will then return along wire 121 to the wire 122. Attention is also directed to the fact that the wire 150 also establishes a similar circuit to the main length of the outer rail 117 and returns through wire 121. It will thus be apparent that the wiring diagram contemplates the use of a full voltage circuit by which the clamping solenoids of the hoppers are initially energized when the switches 123 or 130 are closed, and circuits of low voltage which have sufficient strength to maintain a single solenoid magnet 51 in its energized position, and a low voltage circuit of high potential which will maintain a plurality of solenoid magnets 51 in their energized conditions. In view of the fact that these various circuits are defined by breaks in the trolley rail 117 it is desirable to interpose short lengths of rail between rail sections which may carry circuits of varying potential. These are shown in Fig. 11 of the drawings as carrying the reference numerals 151ª, 152 and 153. The short section 151ª is connected by a wire 154 to one side of a 125-ohms coil 155. The other side of this coil is connected to the wire 129. A wire 156 connects the wire 154 with the section 152. A wire 157 connects the section 153 with one side of the 125-ohms resistance coil 146. Automatic means are provided to cause the filled sacks to be released from the sleeves upon which they are placed and the hoppers by which they have been filled after they have passed the filling station. This means also insures that in the event the sack has not been filled when it passes the filling station, the release mechanism will not be rendered operative but will cause the sack to remain in its gripped position and will be carried around with the conveyor mechanism until such time as it has been properly filled. This structure involves the use of a broken section 117ᵉ in the track 117, and which section is normally supplied with electricity through a wire 158 secured to one side of a switch 159. The opposite side of this switch is secured to a wire 160 which connects the adjacent ends of the track 117 and leads the current around the switch so that all of the track 117 will remain energized as well as the section 117ᵉ. The switch 159 is fitted with a lever 161 which stands in the path of travel of the sacks, but is not actuated by the sacks unless they are filled so that their side walls are distended and are made non-yielding, due to the fact that the sacks are packed with sugar.

*Operation.*

In the operation of the present invention operators stand at stations A and B, as indicated in the wiring diagram Fig. 11, and are there supplied with empty sacks 35. It is to be understood that the number of sack hanging stations will be determined by the length of the endless conveyor and the number of hoppers carried thereby, as well as the speed at which the hoppers are travelling, due to the fact that one operator could not supply sacks to all the hoppers as they passed. The sleeve 25 of a particular hopper 22 is inserted into the open mouth of a sack 35, and when properly positioned with relation thereto the operator temporarily closes the switch 123 or 130, as the case may be. For the purpose of explanation, the operation will be considered as taking place at station A. When the switch is closed a circuit will be completed from D. C. feed wire 91 along wire 122 through the switch 123 and then along the wire 124 to the solenoid coil 125 of the relay switch 126. The circuit will then be completed through a conductor 128 to a wire 129, and then to the return lead wire 92. This action will shunt the resistance coil 136 out of circuit with the rail segment 117a, it being understood that a low voltage, low potential circuit is normally established through the rails and rail sections, as for example the circuit through the resistance coil 136 which continues along wire 135 to the section 117a and thence travels along the trolley rail 118 to the wire 121 and the return lead wire 122. When the relay switch 126 is energized a circuit will be completed from wire 92 along wire 129 to wire 140, thence along wire 139 to wire 135 which connects with the segment 117a. The circuit continues along the track segment 118 to wire 121, and thence along wire 122 to lead wire 91. While this circuit is completed the entire voltage of the D. C. wires 91 and 92 will be delivered to the solenoid 51 of the hopper structure, which happens to be in contact with the section 117a of the trolley rail 117. As the hopper continues in the direction of the arrow X, its contact members 119 and 120 will continue in frictional engagement with the trolley rails 117 and 118 including the broken sections, and the moment the high voltage circuit is broken by releasing the operating switch 123 and opening the relay switch 126 a low voltage circuit will be applied to the section 117a, this current being of sufficient strength to maintain the solenoid 51 in its energized condition. As the hopper structure moves on to the area defined by the length of track 117d it will be evident that more than one solenoid will be receiving energy from the rails 117 and 118, and that additional current must be supplied. The circuit delivering this additional current includes wire 129 connected to one side of a low resistance coil 149, and thence travels along wire 150 to wire 151 and to section 117d. It is to be understood, however, that the current in this circuit is not sufficient to operate the solenoid 51 of any of the hoppers, so that if the operator has not energized a solenoid 51 with the full current of the main line the solenoid will still be inoperative and inactive during its travel along the tracks. As the contact members 119 and 120 momentarily pass along the breaker sections of the track 117 the solenoid coils 51 will be energized with the low voltage current passing through resistance coils herein indicated as being of 125-ohms. The hopper, with its sack and energized solenoid 51, will then travel along the pathway as defined by the conveyor chain 21, and will in time pass successively beneath the scale units 23. Assuming that hopper 22a was first energized, it will pass beneath the series of scale units 23 first, and when in filling relation to the scale unit 23a will receive the measured quantity of material which is delivered through scale spout 61 to the hopper 22. Explanation has already been made of the operation of the mercury switch 115, by which a predetermined weight of sugar has been deposited in the scale unit, and the solenoid 113 by which the measured quantity of material is released to feed from the scale spout 61 into the hopper 22 as the hopper continues its travel. Explanation has also been made of the manner in which the switch 109 will be actuated to break the circuit through scales release solenoid 113 and to render the scale inoperative when a sack is not being carried by the hopper. It is, of course, understood that the timing cams 71 normally control operation of the release solenoids 113 of their respective scale units, and that they cause the scale units to operate in synchronism with the travelling hoppers 22. As the material is deposited in the bag 35, which bag is temporarily clamped to the sleeve 25, the weight of the material will cause the bag to pull down on the sleeve 25 and thus compress the springs 30 upon which the sleeves are hung. This downward movement of the bag, which is in the process of filling, will continue until the bag rests upon the travelling conveyor 36 so that the weight of the bag will then be supported by the conveyor and from the hopper and the conveyor chain 21. After the filled bag has passed the series of scale units, it will then encounter the extending arm 161 of the switch 159. This will cause the circuit through section 117e of the track 117 to be broken, and to permit the release of the solenoid 51 with the result that the plunger 50 will fall and will cause the clamping members 37 to swing outwardly from their clamping position, so that the loose portion of the sack originally held around the end of the sleeve 25 will fall and will permit the sleeve and the hopper to pursue a different path of travel from that followed by the filled sack 35 as it is carried upon the travelling supporting conveyor 36, while the sleeve 25 is elevated.

It will thus be seen that by the mechanism here disclosed it is possible to accurately weigh the material which is to be placed in a sack, and to rapidly fill the sack by an operation which is automatic, with the exception of the manual labor required to place the sacks upon the sleeves of the hoppers, and that by this arrangement the sacks may be filled with material in much less time than is now possible, and with a substantial reduction in labor cost.

While I have shown and described the preferred form of my invention as now known to me, it is to be understood that various changes may be made in its construction without departing from the spirit of the invention as defined in the appended claims.

Having thus described my invention, what

I claim and desire to secure by Letters Patent is:—

1. In a device of the character described, a tubular filling member, means supporting said member and carrying it along the path of travel, means moving with the tubular member and cooperating therewith to grip and hold a bag in a filling position with relation to said tubular member, means mounted upon and movable with said tubular member automatically acting to maintain said gripping means in their operative position throughout a predetermined period of travel of the tubular member, and means automatically rendering the gripping means inoperative and releasing the bag at a predetermined point in the travel of said tubular member.

2. In a device of the character described, a hopper terminating in a downwardly extending spout, clamping means disposed around said spout and adapted to be moved against the wall thereof to grip a bag and hold it in filling relation to the spout, and a solenoid mounted upon and movable with said spout adapted to actuate said clamping members.

3. In a device of the character described, a hopper terminating in a downwardly extending spout, clamping means disposed around said spout and adapted to be moved against the wall thereof to grip a bag and hold it in filling relation to the spout, a solenoid mounted upon and movable with said spout adapted to actuate said clamping members, means for carrying said hopper and spout along a predetermined path of travel, means for sustaining the solenoid and gripping means in their actuated condition, and means automatically acting to render the solenoid and gripping means inoperative at a point in the path of travel thereof.

4. In a device of the character described, a travelling hopper terminating at its lower end in a tubular spout, a sleeve into which said spout telescopes, means for securing a bag with its mouth disposed around the sleeve and in filling relation thereto, and means for yieldably supporting said sleeve upon the spout whereby the increasing weight of material poured through the spout into the bag will cause the bag to be gradually lowered and a supporting platform upon which said bag will rest when the sleeve and bag are in their lowermost positions.

5. In a device of the character described, a travelling hopper terminating at its lower end in a tubular spout, a sleeve into which said spout telescopes, means for securing a bag with its mouth disposed around the sleeve and in filling relation thereto, means for yieldably supporting said sleeve upon the spout whereby the increasing weight of material poured through the spout into the bag will cause the bag to be gradually lowered and a supporting platform upon which said bag will rest when the sleeve and bag are in their lowermost positions, a travelling conveyor for the spout and a travelling conveyor for the platform, both of said conveyors moving in unison.

6. In a device of the character described, a hopper, a spout at the bottom thereof, a plurality of gripping members arranged around the spout and adapted to be moved inwardly there against to cooperate with the wall of the spout in gripping a bag and holding the same in filling relation to the spout, a solenoid disposed within the spout and means actuated by said solenoid for moving said gripping means to their clamping positions with relation to the wall of the spout.

7. In a device of the character described, a hopper, a spout at the bottom thereof, a plurality of gripping members arranged around the spout and adapted to be moved inwardly there against to cooperate with the wall of the spout in gripping a bag and holding the same in filling relation to the spout, a solenoid disposed within the spout, means actuated by said solenoid for moving said gripping members to their clamping positions with relation to the wall of the spout, a travelling conveyor carrying the spout and associated parts, trolley rails extending there along and through which electric circuits including the solenoid may be established, means for establishing an initial electric circuit through said rails and solenoid to actuate the solenoid, and means for maintaining a circuit to sustain the solenoid in actuated condition as it is carried by the travelling conveyor.

8. In a device of the character described, a hopper, a spout at the bottom thereof, a plurality of gripping members arranged around the spout and adapted to be moved inwardly there against to cooperate with the wall of the spout in gripping a bag and holding the same in filling relation to the spout, a solenoid disposed within the spout, means actuated by said solenoid for moving said gripping members to their clamping positions with relation to the wall of the spout, a travelling conveyor carrying the spout and associated parts, trolley rails extending there along and through which electric circuits including the solenoid may be established, means for establishing an initial electric circuit through said rails and solenoid to actuate the solenoid, means for maintaining a circuit to sustain the solenoid in actuated condition as it is carried by the travelling conveyor, and means automatically interrupting the circuit to cause the de-energization of the solenoid whereby the gripping means will be released.

LOUIS L. EDMUNDS.